(12) United States Patent
Johnson, Jr.

(10) Patent No.: US 9,940,615 B2
(45) Date of Patent: Apr. 10, 2018

(54) AUTOMATED PAIRING OF PAYMENT PRODUCTS AND MOBILE TO MOBILE DEVICES

(71) Applicant: FleetCor Technologies Operating Company, LLC, Norcross, GA (US)

(72) Inventor: Max L. Johnson, Jr., Mount Pleasant, SC (US)

(73) Assignee: Fleetcor Technologies Operating Company, LLC, Norcross, GA (US)

( * ) Notice: Subject to any disclaimer, the term of this patent is extended or adjusted under 35 U.S.C. 154(b) by 177 days.

(21) Appl. No.: 14/494,035

(22) Filed: Sep. 23, 2014

(65) Prior Publication Data

US 2015/0026047 A1    Jan. 22, 2015

Related U.S. Application Data

(63) Continuation-in-part of application No. 14/054,279, filed on Oct. 15, 2013, now Pat. No. 9,563,893.

(Continued)

(51) Int. Cl.

| | |
|---|---|
| *G06Q 40/00* | (2012.01) |
| *G06Q 20/32* | (2012.01) |
| *G06Q 50/30* | (2012.01) |
| *G06Q 20/40* | (2012.01) |
| *G06Q 30/02* | (2012.01) |
| *G06Q 20/22* | (2012.01) |
| *G01C 21/28* | (2006.01) |
| *G06Q 20/34* | (2012.01) |

(Continued)

(52) U.S. Cl.
CPC ......... *G06Q 20/3224* (2013.01); *G01C 21/28* (2013.01); *G06Q 20/223* (2013.01); *G06Q 20/34* (2013.01); *G06Q 20/405* (2013.01); *G06Q 30/0269* (2013.01); *G06Q 50/30* (2013.01); *G07C 5/008* (2013.01); *H04W 4/023* (2013.01)

(58) Field of Classification Search
CPC .... G01C 21/00; G01C 21/26; G01C 21/3688; G06Q 10/06; G08G 1/20; G08G 1/205
See application file for complete search history.

(56) References Cited

U.S. PATENT DOCUMENTS

| | | |
|---|---|---|
| 7,340,332 B2 | 3/2008 | Underdahl et al. |
| 7,362,229 B2 | 4/2008 | Brinton et al. |

(Continued)

OTHER PUBLICATIONS

International Search Report for International Patent Application No. PCT/US2014/056974, dated Dec. 24, 2014.

*Primary Examiner* — Scott S Trotter
(74) *Attorney, Agent, or Firm* — King & Spalding (57) ABSTRACT

A computer receives card transaction data in response to a transaction using a financial services card. The card transaction data identifies at least a location, date, and time associated with the transaction. Upon receiving the card transaction data, the computer compares the card transaction data with telematics information associated with a vehicle equipped with a telematics device. The telematics information identifies at least a location of the vehicle, and a time and date associated with the location of the vehicle. On the basis of the comparison, the computer determines if the location of the transaction substantially matches the location of the vehicle at the time and date of transaction. Responsive to determining a substantial match, the computer associates the financial services card with the vehicle.

13 Claims, 6 Drawing Sheets

Related U.S. Application Data (60) Provisional application No. 61/881,462, filed on Sep. 24, 2013, provisional application No. 61/714,436, filed on Oct. 16, 2012.

(51) Int. Cl.
*G07C 5/00* (2006.01)
*H04W 4/02* (2018.01)

(56) References Cited

U.S. PATENT DOCUMENTS

| | | |
|---|---|---|
| 7,388,518 B2 | 6/2008 | Mitchell et al. |
| 7,397,365 B2 | 7/2008 | Wang |
| 7,400,970 B2 | 7/2008 | Jones |
| 7,406,321 B2 | 7/2008 | Beiermeister |
| 7,538,667 B2 | 5/2009 | Koen |
| 7,557,696 B2 | 7/2009 | Brinton et al. |
| 7,564,375 B2 | 7/2009 | Brinton et al. |
| 7,584,887 B1 | 9/2009 | Sanchez et al. |
| 7,606,579 B2 | 10/2009 | Thacher |
| 7,612,668 B2 | 11/2009 | Harvey |
| 7,616,129 B2 | 11/2009 | Thacher |
| 7,623,985 B2 | 11/2009 | Finch, II et al. |
| 7,680,595 B2 | 3/2010 | Brinton et al. |
| 7,752,302 B2 | 7/2010 | Thacher |
| 7,769,499 B2 | 8/2010 | McQuade et al. |
| 7,801,506 B2 | 9/2010 | Haave et al. |
| 7,808,369 B2 | 10/2010 | Brinton et al. |
| 7,940,173 B2 | 5/2011 | Koen |
| 7,944,345 B2 | 5/2011 | Brinton et al. |
| 8,040,256 B2 | 10/2011 | Rani et al. |
| 8,064,930 B2 | 11/2011 | Enzmann et al. |
| 8,106,757 B2 | 1/2012 | Brinton et al. |
| 8,146,009 B2 | 3/2012 | Mason et al. |
| 8,179,321 B2 | 5/2012 | Rani et al. |
| 8,199,901 B2 | 6/2012 | Rani et al. |
| 8,214,142 B2 | 7/2012 | Cerecke et al. |
| 8,275,508 B1 | 9/2012 | Adams et al. |
| 8,290,701 B2 | 10/2012 | Mason et al. |
| 8,301,158 B1 | 10/2012 | Thomas |
| 8,315,802 B2 | 11/2012 | Brown |
| 8,527,135 B2 | 9/2013 | Lowry et al. |
| 2005/0256681 A1 | 11/2005 | Brinton et al. |
| 2007/0173993 A1 | 7/2007 | Nielsen et al. |
| 2009/0237245 A1 | 9/2009 | Brinton et al. |
| 2009/0280771 A1 | 11/2009 | Bolin |
| 2010/0185479 A1 | 7/2010 | Brinton et al. |
| 2010/0235891 A1 | 9/2010 | Oglesbee |
| 2010/0280734 A1 | 11/2010 | Brinton et al. |
| 2011/0022248 A1 | 1/2011 | McQuade et al. |
| 2011/0068954 A1 | 3/2011 | McQuade et al. |
| 2011/0238300 A1 | 9/2011 | Schenken |
| 2012/0010774 A1 | 1/2012 | McQuade et al. |
| 2012/0053778 A1 | 3/2012 | Colvin et al. |
| 2012/0095920 A1 | 4/2012 | McQuade et al. |
| 2012/0136527 A1 | 5/2012 | McQuade et al. |
| 2012/0136743 A1 | 5/2012 | McQuade et al. |
| 2012/0136802 A1 | 5/2012 | McQuade et al. |
| 2012/0139696 A1 | 6/2012 | McQuade et al. |
| 2013/0185193 A1* | 7/2013 | Boling ............ G06Q 20/3224 705/39 |

\* cited by examiner

AUTOMATED PAIRING OF PAYMENT PRODUCTS AND MOBILE TO MOBILE DEVICES

CROSS REFERENCE TO RELATED APPLICATIONS

This application is a continuation in part of U.S. patent application Ser. No. 14/054,279, entitled 'Method and System for Detection of a Fuel Card Usage Exception,' filed on Oct. 15, 2013, which in turn claims priority to U.S. Provisional Patent Application No. 61/714,436 filed Oct. 16, 2012 in the names of Max L. Johnson, Jr., Jeffrey D. Lamb, and Donovan Williams and entitled "Fuel Card Transaction Fraud Detection, Authorization, and Promotion," the entire content of each of the applications being incorporated herein by reference. This application also claims priority to U.S. Provisional Application No. 61/881,462 filed on Sep. 24, 2013 in the name of Max Lee Johnson entitled "Automated Telematics Device/Payment Product Pairing," the entire content of this provisional patent application being incorporated herein by reference.

FIELD OF INVENTION

This invention relates generally to computer-implemented data computation and, more particularly, to computer-assisted automatic pairing or linking of devices and/or devices to payment methods.

BACKGROUND

Businesses may provide its employees with payment products that can be used by the employees to cover approved expenses associated with using various assets associated with the businesses. For example, a business may own or lease a plurality of vehicles for various purposes, such as goods transportation, fulfilling delivery orders, and/or employee travel related to the business. The business may cover expenses that are associated with the vehicles, such as the fuel cost and/or the maintenance cost of the vehicles. Further, the business may furnish the drivers of the vehicles with payment products, such as financial services cards and/or fuel cards that may be used by the drives to cover the approved expenses.

Co-relating and cross-checking information provided by the payment products associated with the employees and the assets of the business used by the employees can provide greater business insights, such as asset usage pattern of the employee, payment card and asset usage statistics associated with the employee, fraudulent or unauthorized usage statistics, and so on. In addition, co-relating and cross-checking information provided by mobile phones associated with the employees and the assets of the business used by the employees can provide further business insights. A quick and easy co-relation and cross-checking of information associated with the payment product, mobile phone and/or asset can be achieved by pairing or linking each payment product of an employee and/or mobile phone of the employee with the respective one or more assets used by the employee.

Conventional technology for pairing payment products and/or mobile computing devices to assets require a user to query each employee to obtain identifiers associated each of the payment product associated with the employee, the mobile computing device associated with the employee, and the asset used by the employee. Further, the user has to manually enter the information obtained through the query and manually record matching pairs of the payment products/mobile computing devices and assets. In other words, pairing using conventional technology depends on manual entry and matching operations which can be both time and cost-intensive. Further, conventional technology may be subject to inevitable human error which may result in inaccurate business insights for the businesses. Thus, there is a need for a technology that addresses the above-mentioned deficiencies.

SUMMARY

The present disclosure can address the above-described needs by an automated pairing of (i) payment products and mobile to mobile devices (M2M) (e.g., mobile phones, tablets, vehicle telematics device, etc.) and/or (ii) M2M devices to one another. In particular, the present disclosure utilizes one or more programmed computers to automatically pair financial services cards and/or mobile computing devices of a driver with a vehicle associated with the driver.

In an exemplary embodiment, a driver of a vehicle may be provided a financial service card for covering expenses incurred in association with the vehicle, such as expenses associated with purchase of fuel, vehicle maintenance, etc. The vehicle may be equipped with a telematics device that is configured to collect and transmit vehicle related data, such as a location of the vehicle, a time and date at which the location was recorded, diagnostics associated with the vehicle, etc., to a vehicle database. The vehicle database may include vehicle related data associated with one or more vehicles.

When the driver of the vehicle uses the financial services card for a transaction, a computer receives card transaction data that is associated with the transaction made using a financial services card. The card transaction data includes at least a time, a date, and a location associated with the transaction. One of ordinary skill in the art can understand and appreciate that the card transaction data can include card number, encrypted card number, transaction type, purchased product, product type (unleaded, leaded, premium fuel, etc.), price of purchased product, transaction amount, and so on, without departing from a broader spirit of this disclosure. Once the card transaction data is received, the time, the date, and the location associated with the transaction is compared to vehicle related data stored in the vehicle database to determine a substantial match between the location associated with the transaction and a location of at least one of the one or more vehicles at the time and the date associated with the transaction. The comparison accounts for location accuracy errors and makes necessary adjustments.

Responsive to a substantial match of the location associated with the transaction with a location of at least one of the one or more vehicles at said time and date associated with the transaction, the computer associates (pairs) the financial services card with the vehicle whose location substantially matched the location of the transaction. However, if the comparison results in a match of the financial services card with more than one vehicle, then, the computer re-runs the comparison using card transaction data corresponding to subsequent transactions made using the financial services card. In one example, the comparison may be re-run until the pairing can be narrowed down to a paring between one financial services card and one vehicle for a given transaction time and date associated with the financial services card. In another example, the comparison may be re-run for a pre-determined number of times. The re-running of the comparison using card transaction data corresponding to subsequent transactions is also used to reinforce an initial association (pairing) of the financial services card and the vehicle. In one example, the pairing can also be reinforced by comparing historical card transaction data of the financial services card with historical vehicle related data associated with the matched vehicle.

For example, a computer receives a card transaction data corresponding to a financial services card Y. The received card transaction data indicates that a transaction using the financial services card Y was made at location X at 5.30 pm on Monday, Aug. 1, 2004. In said example, a vehicle database may include vehicle related information associated with a plurality of vehicles. The vehicle related data is received from telematics device equipped in each of the plurality of the vehicles, e.g., 'n' vehicles. Upon receiving the card transaction data, the computer compares the card transaction data to the vehicle related data stored in the vehicle database to determine if any of the 'n' vehicles were present at location X or within a radius of location X at 5.30 pm on Monday, Aug. 1, 2004. Suppose the computer determines that vehicle Z was at location X at 5.30 pm on Monday, Aug. 1, 2004, then, the computer pairs financial services card Y with vehicle Z. Further, to reinforce the pairing, the computer re-runs the comparison with card transaction data associated with the next transaction, e.g., transaction at 6.30 pm, provided the next transaction with financial services card Y occurs at 6.30 pm.

Pairing of financial services cards to the vehicle can provide insight both card usage and vehicle usage patterns. For example, if the financial services card is a fuel card, by matching a unique location history of a vehicle via telematics data with a unique transaction history of a fuel card, it can then be determined that this fuel card (or unique set of fuel cards) is associated with a unique vehicle, and are therefore matched during that window of time. This vehicle related information can then be combined with transaction information to give greater insight into fueling events and vehicle and driver performance. For example, the miles traveled by the vehicle can be combined with the gallons pumped into the vehicle, resulting in a 'true miles per gallon' figure that can be calculated for the vehicle. In addition, pre-authorizing the card for a particular transaction site, e.g., gas station is possible now that it can be determined that the vehicle is located 'on-site' and that it is and has been paired with this particular card. Another advantage in pairing a vehicle to a fuel card is that if the fuel gauge can be read by the telematics system, then the percentage of fuel transactions and gallons of fuel purchased on that fuel card can be determined versus all transactions and gallons associated with that vehicle. This metric can help drive customer service initiatives and promotions targeted to specific customers.

In another exemplary embodiment, a mobile computing device can be associated with a vehicle based on the location of the vehicle obtained from the telematics device associated with the vehicle and a location of the mobile computing device obtained either from within or outside the mobile computing device. In particular, the location of the vehicle at a given time and date is compared with the location of the mobile computing device at said time and date to determine if they substantially match. Upon determining that the location of the vehicle and the mobile computing device match at said time and date, the mobile computing device is associated (paired) with the vehicle for said time and date. Assuming that a phone number associated with the mobile computing device can be linked to a driver or worker, then it follows that this driver or worker can be matched to a specific vehicle during specific times. This paired information can be combined with other information, such as how the vehicle was driven or operated, to provide a fleet manager with visibility into a particular driver that is responsible for certain driving or purchase behaviors.

In addition to pairing a vehicle to a payment product and/or a device associated with a driver of the vehicle, the computer generates and outputs a report for presentation to a used based on the pairing of the vehicle to the payment product and/or the device associated with a driver of the vehicle. For example, the computer can include an output engine or interface for outputting reports for presentation of one or more analysis results based on the paired vehicle and payment product and/or paired vehicle and the device associated with a driver of the vehicle. The report may be generated in text and/or graphical formats. Example analysis reports can include, but are not limited to, a listing of vehicles with their respective payment cards or devices of drives to which they are paired, alerts identifying fraudulent usage of the payment product, a real-time gas mileage of the vehicle, a driving pattern of the vehicle, maintenance of the vehicle, and so on. The computer can output the report in an electronic form, in a printed form on paper, or as electronic information transmitted by a computer via a communication network for presentation at a location remote from the physical location of the computer that generates the report.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of the accompanying drawings, in which.

Many aspects of the invention can be better understood with reference to the above drawings. The elements and features in the drawings are not to scale; emphasis is instead being placed upon clearly illustrating the principles of example embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method, and an apparatus for automated pairing or linking of M2M devices to other M2M devices and/or to payment products. Before discussing the embodiments directed to the method and system of automated pairing, it may assist the reader to understand the various terms used herein by way of a general description of the terms in the following paragraphs.

The term 'mobile to mobile (M2M) devices' as used herein may generally refer to any appropriate mobile data processing device. M2M devices may include mobile phones, smart phones, tablets, and vehicle telematics devices. Each M2M device may have wireless communication capability for transmission or reception of data via wireless networks.

The term 'telematics device' as used herein may generally refer to any appropriate device that is adapted to send, receive, and store information via telecommunication devices. In one example embodiment, the telematics device may be configured to send information associated with a vehicle, such as location of the vehicle, a heading direction of the vehicle, speed of the vehicle, distance traveled by the vehicle, and so on. In addition, the telematics device may be configured to store and/or send data associated with a condition of the vehicle. For example, the telematics device may be configured to receive the fuel level data of the vehicle from a vehicle bus and/or communicate the received fuel level data over a telecommunication network.

The telematics device may be adapted to be used with the vehicle. In one embodiment, the telematics device may be an independently purchasable device that is configured to be attached to and/or detached from the vehicle as desired. For example, the telematics device may be attached to an onboard diagnostics (OBD) port of the vehicle to receive data associated with the vehicle from the vehicle bus. In another embodiment, the telematics device may be integrated with the vehicle. For example, the telematics device may be a Global Positioning System technology integrated with computers and mobile communications technology present in automotive navigation and internal network systems, such as OnStar®.

The term 'vehicle bus,' as used herein may generally refer to any appropriate internal communications network of a vehicle that interconnects components inside the vehicle. The internal communications network of the vehicle may allow micro controllers and devices such as engine control unit, transmission control unit, anti-lock breaking system, body control modules, other sensors, etc., that are already present in the vehicle to communicate with each other within the vehicle. The internal communication network, the micro controller, and the devices of the vehicle may operate in concert to collect, handle, and maintain any appropriate data associated with a condition of the vehicle, such as fuel level data of the vehicle, brake fluid level, engine status, and so on. The different vehicle bus protocols may include, but are not limited to, Controller Area Network (CAN), Local Interconnect Network (LIN), Domestic Digital Bus (D2B), FlexRay, DC-BUS, IEBus, Media Oriented Systems Transport (MOST), SMARTwireX, and so on.

In one example embodiment, the data collected, handled, and/or maintained by the vehicle bus can be obtained by connecting to the vehicle bus via an on board diagnostics (OBD) connector. One of ordinary skill in the art can understand and appreciate that the list of example devices, micro controllers, and data collected and maintained by the vehicles internal communication network is not exhaustive.

The term 'financial services card,' as used herein may generally refer to any appropriate payment card. For example the financial services card may include, but is not limited to, debit cards, credit cards, fuel cards, gift cards, and so on. One of ordinary skill in the art can understand and appreciate that the above-mentioned examples of financial services cards may not be exhaustive and may include any appropriate card that can be used by a cardholder, and accepted by a merchant to make a payment for a purchase or in payment of some other obligation. In one example embodiment, the financial services card may be a physical card, such as a magnetic stripe card. In another example embodiment, the financial services card may be a smart card. For example, the fuel card may be an NFC based card, RFID based card, QR code based cards, and so on. In yet another example embodiment, the financial services card may be software implementation, such as a mobile payment card stored in a mobile wallet wherein the payment is performed via a mobile computing device.

The term 'card transaction data,' as used herein may generally refer to any appropriate data associated with the usage of the financial services card. For example, the financial services card transaction data can include information representative of the location at which the financial services card was used, the time and date at which at the financial services card was used, a quantity of an item purchased using the financial services card, and so on. One of ordinary skill in the art can understand and appreciate that these examples of financial services card transaction data are not exhaustive and that the financial services card transaction data may include or may include some of the above mentioned data. In some embodiments, the financial services card transaction data may include any appropriate number and type of additional information associated with purchase using the financial services card.

The term 'telematics information,' as used herein may generally refer any appropriate data associated with a vehicle. The telematics information may be received from a telematics device installed in the vehicle and can include, but is not limited to, location of the vehicle, an amount of fuel present in the fuel tank of the vehicle, an oil level of the vehicle, a performance of the engine, a maintenance and service of the vehicle, a tire pressure of the vehicle, a condition of the windshield of the vehicle (broken), a broken taillight, an issue with the alignment of the wheels of a vehicle, an issue with a headlight of a vehicle, an issue associated with a license plate of the vehicle, an issue with the breaks of the vehicle, and so on. One of ordinary skill in the art can understand and appreciate that the above-mentioned examples that represent the condition or state of a vehicle are not exhaustive and may include any appropriate data associated with the body of the vehicle, external features of the vehicle, internal features of the vehicle, electronics of the vehicle, electrical features of the vehicle, control features of the vehicle, and so on, without departing from a broader scope of the disclosure. Each data received from the telematics device may be time stamped, wherein the timestamp associated with the received data may be indicative of a time and date at which the data was obtained or recorded by the telematics device.

In one example embodiment, a computer is configured to receive transaction data that includes at least a location of the location associated with a transaction made using a payment card, such as a fuel card, and a unique identifier associated with the fuel card. Upon receiving the transaction data, the computer determines the vehicle, the driver of the vehicle, and/or the telematics device of the vehicle (collectively referred to herein 'pairing elements') to which the transaction data is associated. To determine the association, the computer may compare the unique identifier associated with the fuel card against an association table stored in a database. The association table may include a mapping of the unique identifier associated with the fuel card to a unique identifier of one or more of the pairing elements. The association table may be generated by the computer responsive to pairing the fuel card with one or more of the pairing elements. In one example embodiment, the fuel card may be paired with one or more of the pairing elements initially when a manager provides the fuel card to the driver of the vehicle, wherein the pairing may be done automatically and/or manually by either the driver or the manager. In another example embodiment, the fuel card may be paired with one or more the pairing elements on the fly. That is, the pairing may not be done initially. Rather, the pairing occurs automatically on the go without any manual entries or intervention. The current application describes an automated pairing of a payment product (e.g., fuel card, debit card, credit card, etc.) and/or a mobile computing device (e.g., phone, laptop, tablet, pager, etc.) with a vehicle.

As described above, pairing the fuel card may include mapping a unique identifier of the fuel card with a unique identifier associated with either the computing device of the driver, the vehicle, and/or the telematics device. For example, the fuel card number may be mapped to a Vehicle Identifier Number (VIN) associated with the vehicle. In another example, the fuel card number may be mapped to a unique device number, such a manufacturer embedded code associated with the telematics device. In yet another example, the account number associated with the fuel card may be mapped to an International Mobile Station Equipment Identifier (IMEI) number or phone number of a smart phone associated with the driver. In some example embodiments, one or more identifiers of the fuel card may be mapped to a unique identifier (many-to-one) associated with either the computing device of the driver, the vehicle and/or the telematics device to account for the difference in transaction data based on the different POS devices.

Pairing a payment card, such as the fuel card with a vehicle, a telematics device associated with the vehicle, and/or the computing device associated with the driver of the vehicle can be used to detect a fraudulent usage of the payment card, determining a driving pattern of the driver, determining a real-time gas mileage of the vehicle, and so on.

An example embodiment for automated pairing of a payment product and/or a mobile computing device with a vehicle includes a computer that is configured to receive a location associated with a transaction made using the payment product, a location of the mobile computing device, and a location of the vehicle obtained from a telematics device associated with the vehicle. Data that provides location is time stamped with a time and date at which the location was obtained or recorded. Upon receiving the location, and time and date associated with the location, a computer compares the location of the transaction and/or the location of the mobile computing device with the location of the vehicle at the time and date associated with the location of the transaction and/or the mobile computing device, respectively. If the comparison results in a substantial match between the location of the transaction and the location of the vehicle and/or the location of the mobile computing device and the location of the vehicle, the computer pairs the vehicle with the payment product and/or the mobile computing device, respectively. Responsive to pairing, the computer can continue to collect data associated with the payment product, the vehicle that is paired with the payment product, and/or device associated with the driver that is paired with the vehicle. The collected data can be analyzed to generate reports that identify payment card fraud, driving pattern, real-time gas mileage of the vehicle, and so on. The report can also identify the paired payment card and vehicle, the paired device associated with the driver and the vehicle, and/or the paired payment card and the telematics device associated with the vehicle. The computer can present the report in a digital format and/or output the report in the form of a tangible report via an output device such as a printer.

Technology for automated pairing of payment products and/or mobile computing devices to a vehicle will now be described in greater detail with reference to FIGS. 1-4, which describe representative embodiments of the present invention. First, FIG. 1 will be discussed in the context of describing a representative operating environment associated with the automated pairing according to certain exemplary embodiments of the present invention. FIG. 2 will be discussed, making exemplary reference back to FIGS. 1 and 2 as may be appropriate or helpful. Further, the remaining FIGS. 3-4 will be discussed, making exemplary reference back to FIGS. 1 and 2 as may be appropriate or helpful.

The following paragraphs describe various embodiments of the method and system for automated pairing. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Further, the present invention may be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Figure 1:
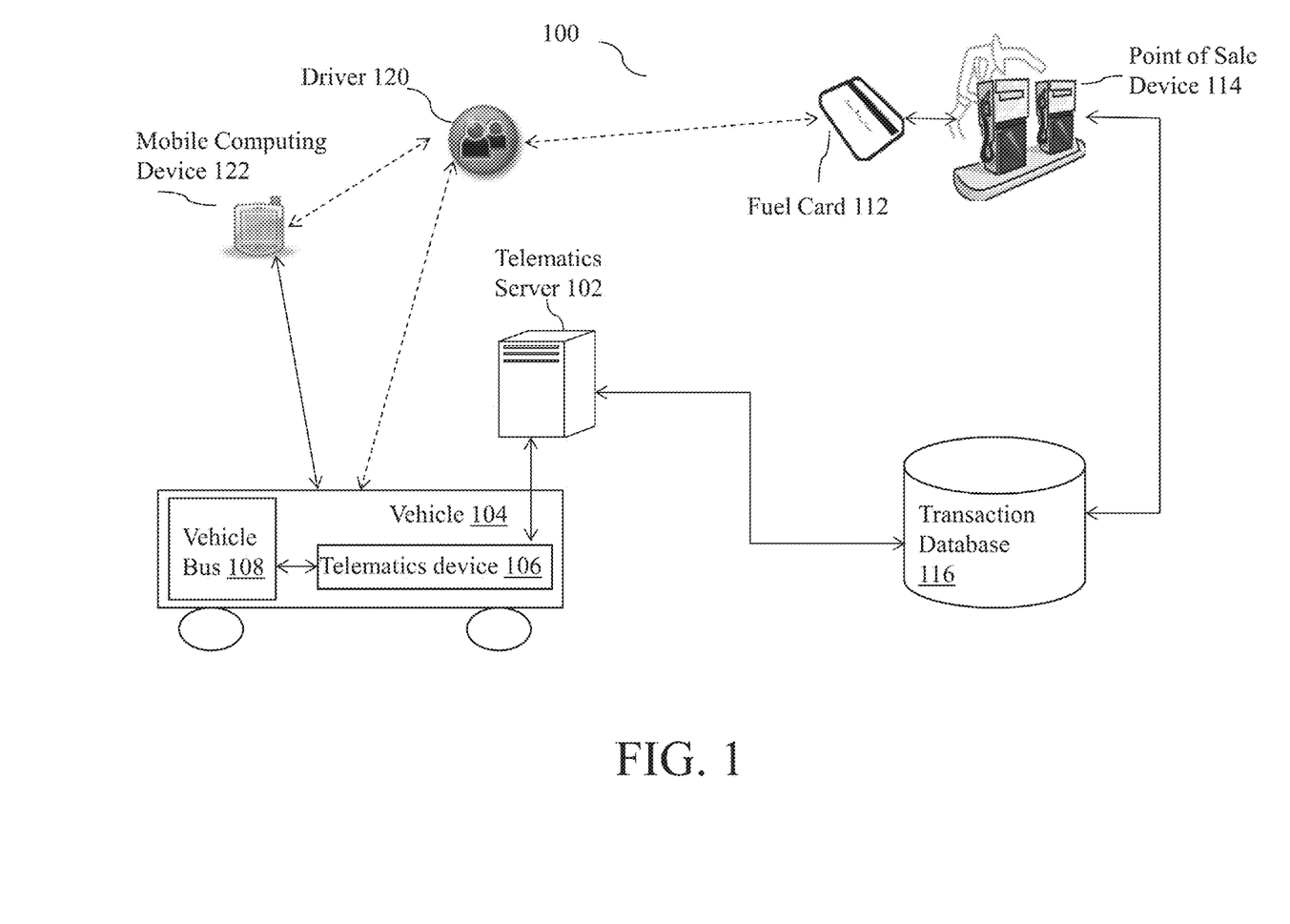
FIG. 1 illustrates an example system for automated pairing of mobile to mobile devices with other mobile to mobile devices and/or with payment products, according to certain exemplary embodiments.
Figure 2:
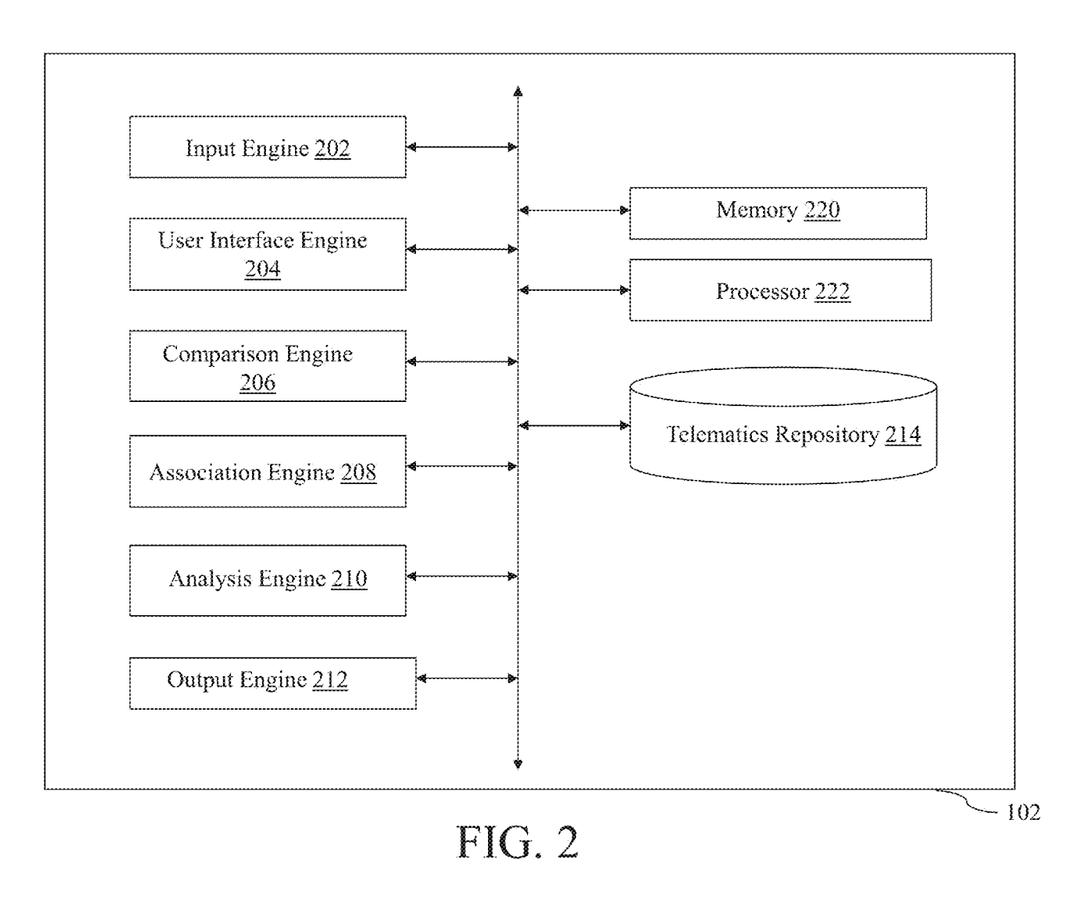
FIG. 2 illustrates an example functional block diagram of the telematics server illustrated in FIG. 1, according to certain exemplary embodiments.

Moving now to discuss FIG. 1, this figure illustrates an example operating environment for automated pairing of mobile to mobile devices with other mobile to mobile devices and/or with payment products, according to certain exemplary embodiments. In particular, FIG. 1 illustrates a telematics server 102, a vehicle 104, a telematics device 106, a vehicle bus 108, a driver 120, a financial services card 112, a point of sale device 114, a transaction database 116.

As illustrated in FIG. 1, the example operating environment 100 for automated paring includes a vehicle 104 equipped with a telematics device 106. The telematics device 106 may be coupled to a vehicle bus 108 of the vehicle 104 and configured to collect telematics information associated with the vehicle 104 from the vehicle bus 108. The telematics device 106 may be configured to timestamp the telematics information, wherein the timestamp provide information associated with a time and date at which the telematics information is obtained by the telematics device or the vehicle bus 108. For example, the telematics information may include a vehicle location data which has a timestamp. In said example, the timestamp associated with the vehicle location data provides date and time at which the location of the vehicle was recorded either by the vehicle bus 108 or by the telematics device 106.

Responsive to collecting telematics information, the telematics device 106 may transmit the collected information to the telematics server 102. In one embodiment, the telematics device 106 may be configured to transmit the telematics information of the vehicle 102 based on pre-set trigger events, i.e., the telematics device 106 may automatically transmit data when the trigger event occurs. The trigger event may include, but is not limited to, turning on the ignition of the vehicle or turning off the ignition of the vehicle, reaching pre-set intervals of time or distance. For example, the telematics device 106 may be configured to transmit telematics information at regular intervals of time or distance. In another embodiment, the telematics device 106 may be configured to transmit the telematics information upon receiving a request for the telematics information associated with the vehicle 104. In yet another example embodiment, the telematics device 106 may be configured to transmit the telematics information based on a location of the vehicle. For example, when the telematics device 106 determines that the vehicle 104 has crossed a virtual geographical boundary such as geo-fence, the telematics device 106 may be configured to transmit the telematics information. In said example, the telematics device 106 may be configured to transmit telematics information when the vehicle enters a geo-fence and/or leaves the geo-fence.

In the example operating environment 100, each driver 120 may be provided with or may possess a mobile computing device 122, such as a smart phone, tablet, etc. In one embodiment, the mobile computing device 120 may have location determination capability, such as GPS capability, and the mobile computing device 122 may be configured to transmit its location to the telematics server 102 at regular intervals. For example, a client side application of the telematics server 102 may be installed in the mobile computing device 122 and may be configured to collect, time stamp, and send location information associated with the mobile computing device 122 to the telematics server 102 at regular intervals. In another embodiment, the telematics server 102 may obtain the location of the mobile computing device 122 from a service/wireless network provider associated with the mobile computing device 122.

Further, in the example operating environment 100 illustrated in FIG. 1, each driver 120 or worker that is responsible for the vehicle 104 is provided with a financial services card 112 to cover expenses associated with the vehicle 104, such as purchasing fuel for the vehicle, maintenance of the vehicle, etc. In one embodiment, the financial services card 112 may be regulated based on certain rules such as the number of purchases that a user is allowed to make using the financial services card, specific stores and point of sale (POS) devices where the financial services card 112 may be used, the time of day that the financial services card may be used for purchases, and so on. In another embodiment, the fuel card may be void of such regulations, i.e., a driver 120 may be provided unregulated use of the financial services card 112.

In an example embodiment, the driver 120 may decide to use the financial services card 112 for a transaction, e.g. to refuel the vehicle 104. Accordingly, the driver 120 may use the financial services card 112 at a POS device 114 at a location of the transaction. The POS device 114 may be a computing device adapted to read, authorize, and/or process the financial services card 112, e.g., a financial services card reader integrated with a cash register or a mobile card reader like Square®. In some embodiments, the financial services card 112 may be pre-authorized for purchase. In other embodiments, the driver 120 may have to enter a personal identification number (PIN) associated with the financial services card 112 which may then be validated to authorize the usage of the financial services card 112.

Once the transaction is completed, the POS device 114 may be configured to transmit the card transaction data associated with the completed transaction to the transaction database 116. The POS device 114 may be configured to time stamp the card transaction data, where the time stamp represents an approximate time of transaction or usage of the financial services card 112. In some embodiments, the POS device 114 may be configured to transmit the card transaction data directly to the fuel card server 118 instead of the transaction database 116. In one embodiment, the card transaction data may be transmitted in the form of batch data at a later time after the transaction using the financial services card 112 is completed, for example at the end of day or after several days. In another embodiment, the card transaction data is transmitted to the transaction database 116 at a time frame that is contemporaneous with the time of transaction.

The transaction database 116 as illustrated in FIG. 1 comprises records identifying transaction information, such as card transaction data, for transactions completed with a financial services card 112. In particular, the transaction database 116 may include, but is not limited to, an account identifier that is associated with each transaction record for that account. An identification hierarchy for a transaction database record includes an account identifier, card identifier and each matching event or action. Each matching action is associated with a unique account. If a driver for a particular vehicle is assigned a unique PIN for use in connection with a transaction, the matching event or action can be associated with both the vehicle 104 and the vehicle's particular driver 120. In one example, the transaction database 116 may be associated with the financial services institution, such as a bank associated with the financial services card 112. In another example, the transaction database 116 may be associated with and maintained by the same entity that is associated with the telematics server 102 or another third party entity.

As illustrated in FIG. 1, the transaction database 116 may be communicatively coupled to the telematics server 102, typically via a wired or wireless network, for collecting and processing card transaction data that is maintained by the transaction database 116. The telematics server 102 includes vehicle history records comprising location data for monitored vehicles over a period of time. The telematics server 102 can compare vehicle history records to card transaction data to identify data having identical or similar date/time stamps and vehicle/transaction locations. In this manner, the telematics server 102 can link or pair a specific vehicle to a particular transaction for a transaction account and the financial services card associated with the transaction, based on a substantial match of vehicle information with transaction information. In addition, the telematics server 102 can link or pair a monitored mobile computing device with a specific vehicle based on a substantial match of mobile computing device location information with vehicle information. As described above, if the phone number or another unique identifier associated with the mobile computing device can be linked to a driver, then the driver can be paired with the specific vehicle. The telematics server 102 is described below in greater detail in association with FIG. 2.

Turning to FIG. 2, this figure illustrates an example functional block diagram of the telematics server illustrated in FIG. 1, according to certain exemplary embodiments. In particular, FIG. 2 illustrates an input engine 202, a user interface engine 204, a comparison engine 206, an association engine 208, an analysis engine 210, an output engine 212, a memory 220, a processor 222, and a telematics repository 214.

The telematics server 102 may be implemented using one or more data processing devices. Further, the telematics server 102 may be implemented as a distributed server system where the operations of the telematics server 102 may be distributed between one or more data processors and/or a centralized server system where the operations of the telematics server 102 may be handled by a single data processor.

As illustrated in FIG. 2, the telematics server 102 may include a processor 222. The processor 222 may be a multi-core processor. In another embodiment, the processor 222 may be a combination of multiple single core processors. In one embodiment, the telematics server 102 can include a memory 220 coupled to the processor 222. The memory 220 may be non-transitory storage medium, in one embodiment, and a transitory medium in another embodiment. The memory 220 can include instructions that may be executed by the processor 222 to perform operations of the telematics server 102. In other words, operations associated with the different engines of the telematics server 102 may be executed using the processor 222.

Further, the telematics server 102 includes a user-interface engine 204. In an example embodiment, the user-interface engine 204 of the telematics server 102 may be configured to provide a web portal (e.g., web interface, hereinafter 'web interface') through which a user may access the telematics server 102. In other words, the users can interact with the telematics server 102 using the web interface provided by the user interface engine 216. In one embodiment, the user-interface engine 204 may be configured to authenticate the users prior to providing access to the telematics server 102. The users authenticated to access the telematics server 102 through the web portal may include, but are not limited to, a server administrator, driver 120, authorized entities such as vehicle fleet management companies, and/or application developers. The data stored in the telematics server 102 may be accessed using an API associated with the telematics server 102. For example, application developers may access the data stored in the telematics server 102 using the API to develop applications based on the data stored in the telematics server 102. In an exemplary embodiment, the user-interface engine 204 may be configured to display information available in the vehicle information repository 214 through the web interface. Authorized users may be allowed to browse the data stored in the various repositories of the telematics server 102 and further run analytics as permitted. In one embodiment, an administrator may have permission for editing and for maintenance of the various engines of the telematics server 102 and their operations.

The telematics server 102 also includes an input engine 202 and output engine 212 configured to enable communication to and from the telematics server 102. The input engine 202 may be configured to receive telematics information from the telematics device 106 associated with the vehicle 104. The input engine 202 stores the received telematics information as vehicle history records in the telematics repository 214. A typical vehicle history record includes, but is not limited to, VIN, vehicle locations in GPS coordinates, date and time for the vehicle location. As described above, vehicles with a GPS receiver and a telematics device 106 can send vehicle information, such as location information, to the telematics server 102 on a periodic basis or in response to a trigger event (such as starting or stopping the vehicle's engine or crossing a geo-fence). A vehicle history record may also include 'direct' vehicle measurements, such as oil temperature or engine temperature or seat belt engagement that are collected directly by the vehicle's processors (vehicle bus 108) and communicated to a central collection site such as the telematics server 102. The vehicle history records may also include 'indirect' measurements that are calculated by the analytics engine 210 of the telematics server 102 using various permutations of direct measurements. An exemplary indirect measurement is represented by a virtual odometer, where total mileage of a vehicle can be calculated over time (odometer) by accumulating readings of latitude/longitude coordinates for location data over time–essentially space-time information for the vehicle.

In addition to receiving telematics information, the input engine 202 may be configured to receive inputs from one or more mobile computing device, e.g., mobile computing device 122, and the transactions database 116. The input received by the input engine 202 may include, but is not limited to, location information associated with each monitored mobile computing device 122 and card transaction data associated with transactions made using each monitored financial services card 112. The card transaction data can be received as and when a financial services card 112 is used for transaction and/or at a later time in the form of batch data. In particular, the card transaction data can include, but is not limited to, location information associated with the transaction and other transaction details, such as card identifier number, purchased items, amount of purchase, and so on. As described above, location information may include at least a location and a time stamp associated with the location. In some embodiments, instead of automatically receiving the location information, the telematics server 102 may be configured to send requests through the output engine 212 for receiving location information.

In either case, upon receiving the location information associated with mobile computing device and/or the transaction, the input engine 202 is configured to communicate the received location information with the comparison engine 206. Then, the comparison engine 206 accesses the telematics repository 214 to retrieve vehicle history records. The retrieved vehicle history records are compared against the received location information associated with mobile computing device and/or the transaction to find a unique match. In one embodiment, the comparison engine 206 compares the location and date/time information to determine whether any vehicles associated with the vehicle history record were located at the transaction (point of sale) location at the transaction date and time. If the location of only one vehicle matches the transaction location and date/time information, then the comparison engine 206 communicates with the association engine 208 to associate or pair the financial services card associated with the transaction and the matched vehicle. A successful match represents a matching or linking of location and date/time stamp data for a transaction with a vehicle location for a date and time. The successful match links or pairs a specific vehicle with a particular transaction and the financial services card 112 associated with the transaction. In another embodiment, the comparison engine 206 compares the location and date/time information to determine whether any vehicles associated with the vehicle history record were located at the location of the mobile computing device 122 at the date and time associated with the location of the mobile computing device 122. Upon identifying a successful match, the comparison engine 206 communicates with the association engine 208 to associate or pair the mobile computing device and the matched vehicle. Further, the association engine 208 determines if the mobile computing device 122 is linked to a user, e.g., driver 120. If the mobile computing device 122 is linked to a driver 120, the association engine 208 pairs the driver 120 with the matched vehicle 104. Each association may be stored in the telematics repository 214 by the association engine 208. One of ordinary skill in the art can understand and appreciate that an embodiment where both the mobile computing device location and the card transaction data are compared with the vehicle history record for pairing is not outside the broader scope of this disclosure.

If the comparison process results in a match of more than one vehicle, then the comparison engine 206 can re-run the comparison task in response to receipt of card transaction data associated with subsequent transactions and/or a mobile computing device location at a subsequent time. In addition, the comparison engine 206 can use the card transaction data associated with subsequent transactions made using the financial service card 112 and/or a mobile computing device location at a subsequent time to further reinforce the match or update the match.

Regarding the comparison, a range or percentage location data and date/time data may be established for identifying a substantial match arising from comparison of transaction data and/or mobile computing device location data to the vehicle history records. For example, a substantial match can be identified by either a perfect one-to-one data comparison—identical location and date/time information—or location or date/time data sets that are within a pre-determined value range to represent a match. For example, a representative threshold for a match of location date is established by a radius of 0.1 or 0.2 miles around the location for a specific retail or services outlet, such as a fueling station.

The operations of the telematics server 102 are described in greater detail below in association with FIGS. 3-4. Accordingly, turning now to FIGS. 3-4, these figures include flow charts that illustrate the process of automated pairing of a vehicle to a payment product and/or a mobile computing device and its corresponding user. Although specific operations are disclosed in the flowcharts illustrated in FIGS. 3-4, such operations are exemplary. That is, embodiments of the present invention are well suited to performing various other operations or variations of the operations recited in the flowcharts. It is appreciated that the operations in the flowcharts illustrated in FIGS. 3-4 may be performed in an order different than presented, and that not all of the operations in the flowcharts may be performed.

Figure 3A:
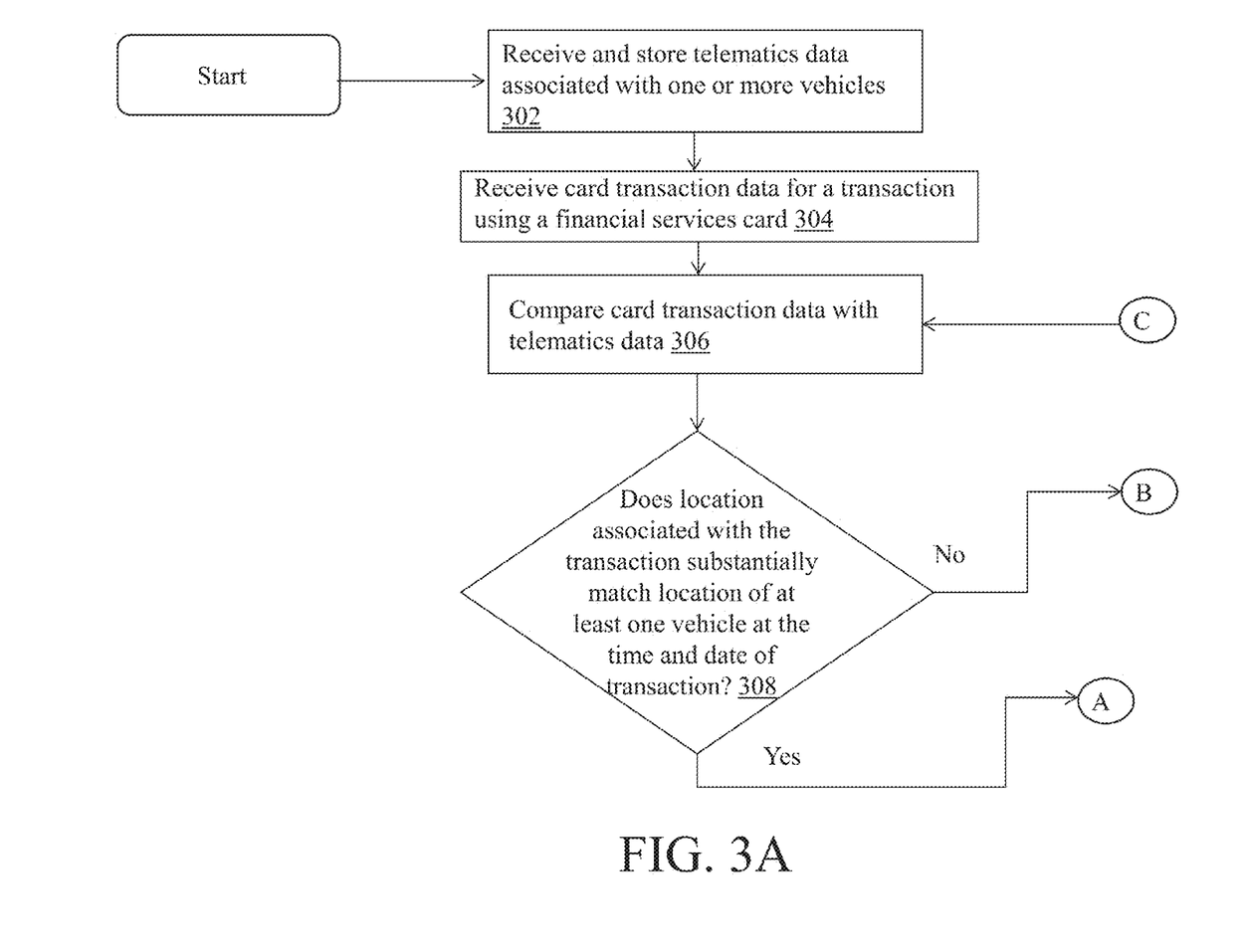
FIGS. 3A and 3B (collectively 'FIG. 3') are flow charts that illustrate a process of automated pairing of mobile to mobile devices with payment products, according to certain exemplary embodiments.
Figure 3B:
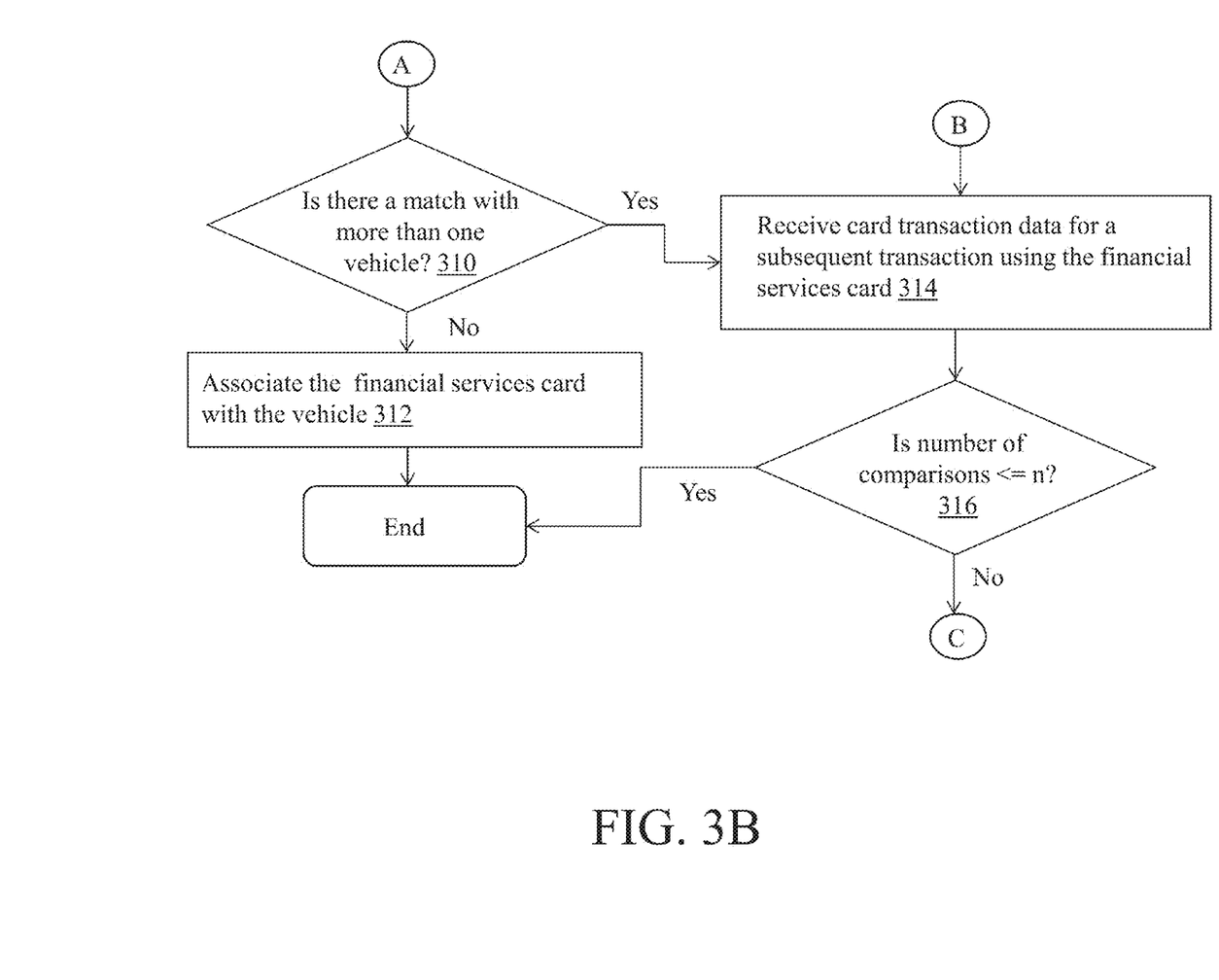
Figure 4A:
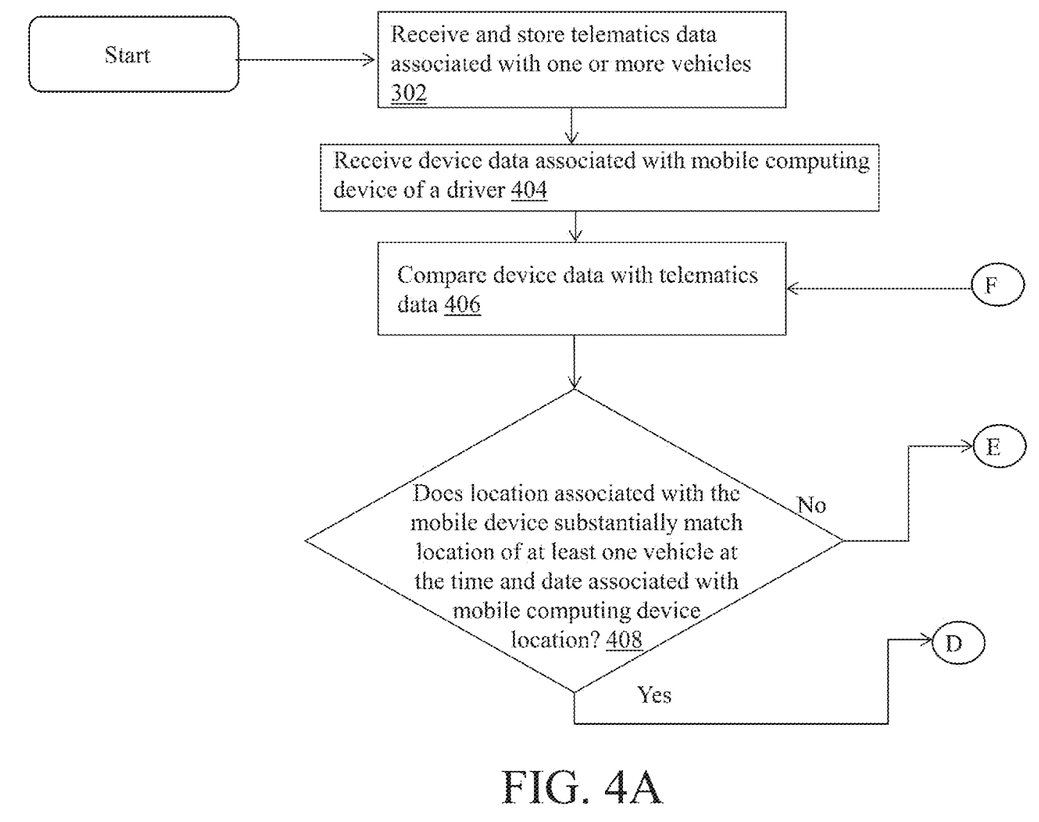
FIGS. 4A and 4B (collectively 'FIG. 4') are flow charts that illustrate a process of automated pairing of mobile to mobile devices with other mobile to mobile devices, according to certain exemplary embodiments.
Figure 4B:
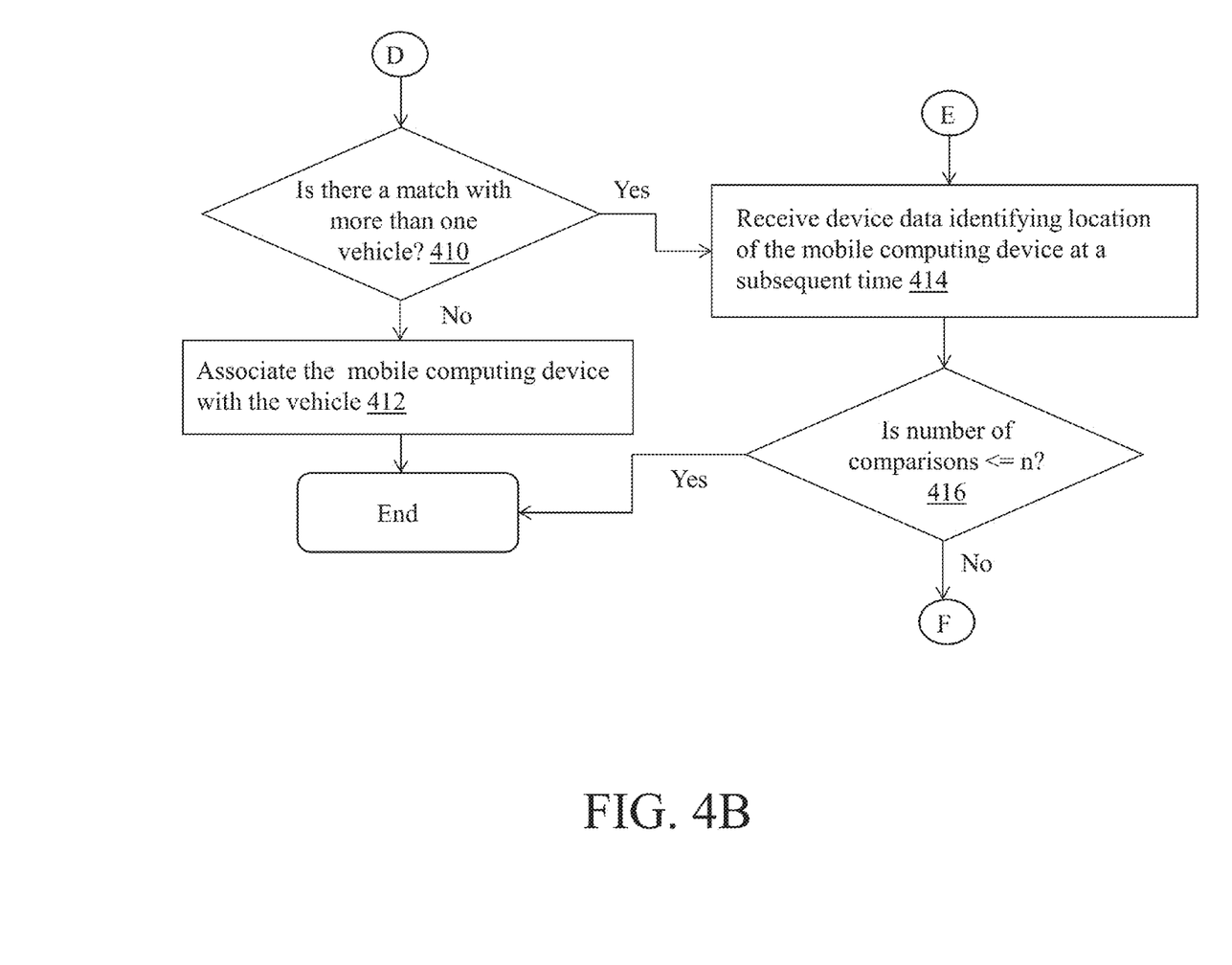

All, or a portion of, the embodiments described by the flowcharts illustrated in FIGS. 3-4 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Turning to FIG. 3, this figure is a flow chart that illustrates a process of automated pairing of mobile to mobile devices (telematics device) with payment products, according to certain exemplary embodiments. In operation 302, the input engine 202 of the telematics server 102 receives and stores telematics information associated with one or more monitored vehicles 104 that are equipped with the telematics device 106. As described earlier, the telematics device 106 of each vehicle 104 may be configured to collect and transmit the telematics information associated with the respective vehicle 104 to the telematics server 102 in response to a trigger event (such as starting or stopping the vehicle's engine or crossing a geo-fence). The telematics information includes at least a location of the monitored vehicle 104 and a time stamp associated with the location of the monitored vehicle 104. For example, if the location of the vehicle is recorded or obtained by the telematics device 106 at 4:10 pm on Oct. 1, 2009, then, the time stamp associated with the location of the vehicle will indicate the time as 4:10 pm and date as Oct. 1, 2009.

In addition to receiving and storing telematics information, in operation 304, the input engine 202 of the telematics server 102 receives card transaction data associated with a transaction made using the financial services card 112. A swipe of the financial services card 112 at a PoS device 114 results in the creation of card transaction data in the form of a transaction payment record that includes transaction data, such as account identifier and/or card identifier, purchase amount, identification of purchased goods or services (for example, the amount of purchased fuel), date and time (date and time stamp) of the transaction and the known location for the transaction (for example, the location of the PoS device 114, in latitude and longitude coordinates). The card transaction data is recorded in the transaction database 116 as transaction payment records which is then forwarded to the telematics server 102 either automatically or upon request from the telematics server 102.

Upon receiving the card transaction data, in operations 306 and 308, the comparison engine 206 of the telematics server 102 compares the card transaction data and the telematics information to identify a substantial match between the location of the transaction obtained from the card transaction data and the location of the vehicle 104 obtained from the telematics information at a time and date of the transaction associated with the card transaction data. If a substantial match is determined, in operation 310, the comparison engine 206 further checks if the transaction location associated with the card transaction data matches the location of more than one monitored vehicle.

If the transaction location substantially matches with the location of more than one vehicle at the time and date associated with the transaction, the telematics server 102 waits to receive card transaction data associated with a subsequent transaction. Once card transaction data associated with a subsequent transaction is received, in operation 316, the telematics server 102 checks to determine if a pre-determined number 'n' of comparisons have been completed. The pre-determined number 'n' can be user-set. In operation 316, if the pre-determined number of comparisons has not been reached, the telematics server 102 returns to operation 306 to re-run the comparison based on card transaction data associated with the subsequent transaction and the telematics information to identify a unique match. On the contrary, in operation 316, if the pre-determined number of comparisons has been reached, the process ends. Alternatively, the condition provided in operation 316 can be adapted such that the telematics server 102 re-runs the comparisons till a one-to-many match has been reduced to a one-to-one match between the transaction and the vehicle.

Returning to operation 310, if the location of only one vehicle matches the transaction location and date/time information, then, in operation 312, the association engine 208 is configured to pair the transaction with the matched vehicle. Further, the financial services card associated with the transaction is paired with the matched vehicle. In some embodiments, if the financial services card 112 can be traced back to the driver 120, the association engine 208 can pair the driver 120 to the vehicle 104. Each pairing is then recorded in the telematics repository 214 to assist with additional analytics, such as to determine driving patterns, driver characteristics, fueling pattern of the vehicle for each driver, real-time mileage of the vehicle, etc.

Turning to FIG. 4, this figure is a flow chart that illustrates a process of automated pairing of mobile to mobile devices (telematics device) with other mobile to mobile devices (mobile computing device 122 of driver 120), according to certain exemplary embodiments. As described in FIG. 3, in operation 302, the input engine 202 of the telematics server 102 receives and stores telematics information associated with one or more monitored vehicles 104 that are equipped with the telematics device 106. In addition to receiving and storing telematics information, in operation 402, the input engine 202 of the telematics server 102 receives device data associated with a monitored mobile computing device 122. The device data includes at least a location associated with the mobile computing device 122. In some embodiments, the device data also includes, but is not limited to, user associated with the mobile computing device 122, unique identifier associated with the mobile computing device 122, such as phone number, physical address, and so on. The mobile computing device 122 may be configured to transmit the device data comprising the location of the mobile computing device 122 at regular intervals or upon receiving a request from the telematics server 102. Alternatively, the telematics server 102 can receive the device data comprising the location of the mobile computing device 122 from external sources, such as the wireless network/service provider associated with the mobile computing device 122.

Upon receiving the device data comprising the location of the mobile computing device 122, in operations 406 and 408, the comparison engine 206 of the telematics server 102 compares the device data and the telematics information to identify a substantial match between the location of the mobile computing device 122 obtained from the device data and the location of the vehicle 104 obtained from the telematics information at a time and date associated with the location of the mobile computing device 122. If a substantial match is determined, in operation 410, the comparison engine 206 further checks if the mobile computing device location associated matches the location of more than one monitored vehicle.

If the mobile computing device location substantially matches with the location of more than one vehicle at the time and date associated with the location of the mobile computing device 122, in operation 414, the telematics server 102 waits to receive the location of the mobile computing device 122 at a subsequent time. Once the location of the mobile computing device 122 at a subsequent time is received, in operation 416, the telematics server 102 checks to determine if a pre-determined number 'n' of comparisons have been completed. In operation 416, if the pre-determined number of comparisons has not been reached, the telematics server 102 returns to operation 406 to re-run the comparison based on the location of the mobile computing device 122 at a subsequent time and the telematics information to identify a unique match. On the contrary, in operation 416, if the pre-determined number of comparisons has been reached, the process ends. Alternatively, the condition provided in operation 416 can be adapted such that the telematics server 102 re-runs the comparisons till a one-to-many match has been reduced to a one-to-one match between the mobile computing device 122 and the vehicle 104.

Returning to operation 410, if the location of only one vehicle matches the mobile computing device location and date/time information, then, in operation 412, the association engine 208 is configured to pair the mobile computing device 122 with the matched vehicle. Further, the association engine 208 can pair the matched vehicle with the driver 120 associated with the mobile computing device 122. Each pairing is then recorded in the telematics repository 214 for addition operations and analytics.

In one example, a fleet management company ABC has ten vehicles numbered 1 to 10 that are used for various operations associated with the company. Each vehicle is equipped with a telematics device that is configured to send telematics data to a telematics server in response to a trigger event (e.g., regular intervals, start and stop of engine, entering and leaving a geo-fence). The fleet management company ABC provides a financial services card M to its employee John Doe and a financial services card N to another employee Jane Roe. Additionally, John Doe also receives a smart phone S from the company. The financial services card M that is provided to John Doe may be configured to be used only for fuel purchase while financial services card N provided to Jane Roe does not have any usage restrictions.

John Doe may decide to use one of the ten vehicles for his business related travel on Mar. 6, 2010. During his travel on Mar. 6, 2010, John Doe may decide to re-fuel his vehicle using his company provided financial services card M. In particular, John Doe may decide to re-fuel his vehicle at 9:10 am on the day of his travel, i.e., Mar. 6, 2010 in a gas station at location X. Upon using the financial services card M for refueling, the POS device 114 where John Doe uses the financial services card M creates card transaction data associated with the financial services card M and records it in the transaction database 116. The card transaction data identifies at least the usage of the financial services card M at location X at 9:10 am on Mar. 6, 2010. Upon receiving the card transaction data, the transaction database 116 communicates with the telematics server 102 to notify the reception of a card transaction data associated with a financial services card M.

The telematics server 102 may have defined rules of engagement with the transaction database 116 ahead of time. The rules of engagement may state that the transaction database 116 is to notify the telematics server 102 regarding any activity associated with financial services cards M and N. Accordingly, upon receiving a card transaction data associated with financial services card M, the transaction database 116 notifies and forwards the card transaction data to the telematics server 102.

Upon receiving the card transaction data, the telematics server 102 retrieves the time, date, and location of the transaction from the card transaction data. Then, the telematics server 102 compares the location of the transaction with the location of each of the ten vehicles obtained from their respective telematics data stored in the telematics repository of the telematics server 102. The comparison determines if the location of the transaction substantially matches the location of at least one of the ten vehicles at the time and date of the transaction. That is, the telematics server 102 determines if any of the ten vehicles were present at location X or within a threshold distance of location X at 9:10 am on Mar. 6, 2010. In said example, the result of the comparison may output vehicle 5 as being present at location X at 9:10 am on Mar. 6, 2010. Accordingly, the telematics server 102 associates or links the financial services card M and the vehicle 5. The pairing may then be stored in a table within a database/repository of the telematics server 102.

Additionally, the telematics server 102 may also receive device information including at least a location of the smart phone S. Further, the telematics server 102 may compare the location of the smart phone S with the location of the ten vehicles obtained from their respective telematics data stored in the telematics repository 214. In said example, the location of the smart phone S may be location X at 9:10 am on Mar. 6, 2010, provided John Doe had the phone with him when he was at the gas station for refueling vehicle 5. Accordingly, the telematics server 102 may check if any of the ten vehicles were at location X of the smart phone S at 9:10 am on Mar. 6, 2010. In said example, the telematics server 102 may determine that vehicle 5 was at location X at 9:10 am on Mar. 6, 2010. Accordingly, the telematics server 102 associates or links the smart phone S and the vehicle 5. If the smart phone S can be traced back to John Doe, the telematics server 102 further associates or links John Doe to vehicle 5. Accordingly, the fleet management company ABC need not associate a user and/or a financial services card to a vehicle ahead of time. Instead, the associations can be automatically made on the go.

In one embodiment, the transaction location based comparison and the smart phone location based comparison may occur one after the other. However, in another embodiment, the transaction location based comparison and the smart phone location based comparison can be combined to form a single comparison condition.

In one embodiment, on the same day, i.e., Mar. 6, 2010, Jane Roe decides to use one of the ten vehicles for her business related travel. Jane Roe may decide to follow John Doe because Jane Roe is not familiar with the route. When John Doe pulls into the gas station at location X, John Roe does the same, but does not re-fuel her vehicle. In said embodiment, assuming Jane Roe is using vehicle 8, upon comparison of the location of transaction with the location of the ten vehicles at the time and date of transaction, the telematics server 102 will identify both vehicle 5 and vehicle 8 as being present at location X at 9:10 am on Mar. 6, 2010. In this situation, the telematics server 102 waits for the next card transaction data associated with a subsequent transaction using the financial service card M. Assuming that the subsequent transaction is at 4:15 pm on Mar. 6, 2013 and assuming that Jane Roe is at a different location that John Doe at 4:15 pm, the telematics server 102 will converge on match between vehicle 5 and the financial services card M and eliminate the match between vehicle 8 of Jane Roe and the financial services card M. Alternatively, the telematics server 102 can re-run the comparisons using transaction location associated with previous transactions, i.e., historical transactions instead of waiting for card transaction data associated with subsequent transactions. In some embodiments, each pairing can be reinforced by re-running the comparisons for a pre-determined number of times.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   (a) retrieving and timestamping, by a telematics device of each vehicle of a plurality of vehicles, telematics information associated with a respective vehicle, wherein the telematics information comprises a location of the respective vehicle, wherein the telematics device of each vehicle is coupled to an on-board diagnostic port of the respective vehicle and comprises a wireless communication capability, and wherein the telematics device of each vehicle is communicably coupled to a remotely located telematics server computer over a wireless network;
   (b) wirelessly transmitting, by the telematics device of each vehicle, the telematics information of the respective vehicle to the telematics server computer over the wireless network;
   (c) receiving via the wireless network, at an input engine of the telematics server computer, card transaction data associated with a transaction using a financial services card, the card transaction data identifying a first location, a first time, and a first date associated with the transaction;
   (d) comparing, by a comparison engine of the telematics server computer, the first location, the first time, and the first date associated with the transaction and telematics information associated with each vehicle of the plurality of vehicles to determine if the first location associated with the transaction substantially matches the location of at least one of the plurality of vehicles at the first time and the first date associated with the transaction;
   (e) determining, by the comparison engine of the telematics server computer, that the first location associated with the transaction substantially matches the location of more than one vehicle of the plurality of vehicles at the first time and the first date associated with the transaction; and
   (f) responsive to determining that the first location associated with the transaction substantially matches the location of more than one vehicle of the plurality of vehicles at the first time and the first date associated with the transaction, comparing, by the comparison engine of the telematics server computer, a second location, a second time, and a second date associated with a subsequent transaction of the financial services card and telematics information associated with each vehicle of the more than one vehicle to determine if the second location associated with the subsequent transaction substantially matches the location of no more than one vehicle at the second time and the second date associated with the subsequent transaction;

responsive to determining a substantial match with the telematics information of no more than one vehicle, (1) eliminating, by an association engine of the telematics server, an association between the financial services card and a remainder of the more than one vehicle of the plurality of vehicles whose locations do not match the second location associated with the subsequent transaction at the second time and the second date associated with the subsequent transaction, wherein the association between the financial services card and a remainder of the more than one vehicle is based on the determination that the first location associated with the transaction substantially matches the location of more than one vehicle of the plurality of vehicles at the first time and the first date associated with the transaction; and (2) creating, by the association engine of the telematics server computer, an association table that maps a unique identifier of the financial services card with a unique identifier of the one vehicle whose location substantially matches the second location associated with the subsequent transaction at the second time and the second date associated with the subsequent transaction, wherein by mapping the unique identifier of the financial services card with a unique identifier of the one vehicle, the financial services card is associated with the one vehicle; and responsive to associating the financial services card to the one vehicle, (1) generating, by an analysis engine of the telematics server computer, one or more analysis results based on a combination of the card transaction data and the telematics information of the associated financial services card and the one vehicle, respectively; and (2) generating and outputting, by an output engine of the telematics device, a report comprising at least one of the one or more analysis results and data pertaining to the association table.

2. The method of claim 1, wherein the telematics device is triggered to transmit the telematics information at each start and stop event of each vehicle's engine.

3. The method of claim 1, wherein the telematics device is triggered to transmit the telematics information upon crossing a geo-fence.

4. The method of claim 1, wherein the telematics device is triggered to transmit the telematics information in periodic intervals.

5. The method of claim 1, further comprising: reinforcing an association of the unique identifier of the financial service card to the unique identifier of the one vehicle by repeating the comparison using card transaction data associated with another subsequent transaction.

6. A system comprising:

a plurality of telematics devices, wherein each telematics device is removably coupled to an on-board diagnostics port of a respective vehicle of a plurality of vehicles and configured to retrieve and wirelessly transmit the telematics information associated with the respective vehicle to a remotely located telematics server computer; and the telematics server computer communicatively coupled to the plurality of telematics devices over a wireless network, wherein the telematics server computer comprises:

an input engine configured to receive card transaction data associated with a transaction using a financial services card that is not associated with a vehicle prior to the transaction, the card transaction data identifying a first location, a first time, and a first date associated with the transaction;

a comparison engine configured to:

compare the first location, the first time, and the first date associated with the transaction and the telematics information associated with each vehicle of the plurality of vehicles to determine if the first location associated with the transaction substantially matches a location of at least one of the plurality of vehicles at the first time and the first date associated with the transaction, wherein the location of each vehicle is obtained from the telematics information of the respective vehicle determine that the first location associated with the transaction substantially matches the location of more than one of the plurality of vehicles at the first time and the first date associated with the transaction;

responsive to determining that the location associated with the transaction substantially matches the location of more than one of the plurality of vehicles at the first time and the first date associated with the transaction, compare a second location, a second time, and a second date associated with a subsequent transaction of the financial services card and telematics information associated with each vehicle of the more than one vehicle to determine if the second location associated with the subsequent transaction substantially matches the location of only one of the more than one vehicles at the second time and the second date associated with the subsequent transaction;

an association engine configured to:

responsive to determining the substantial match with the telematics information of only one of the more than one vehicles, eliminate a match between the financial services card and a remainder of the more than one vehicles of the plurality of vehicles whose locations do not match the second location associated with the subsequent transaction at the second time and the second date associated with the subsequent transaction, wherein the match between the financial services card and the remainder of the more than one vehicles is based on the determination that the first location associated with the transaction substantially matches the location of the more than one vehicles of the plurality of vehicles at the first time and the first date associated with the transaction; and create, responsive to determining the substantial match with the telematics information of only one of the more than one vehicles, an association table that maps a unique identifier of the financial services card with a unique identifier of the one vehicle,
wherein by mapping the unique identifier of the financial services card with a unique identifier of the one vehicle, the financial services card is associated with the one vehicle;
an analysis engine configured to:
responsive to associating the financial services card with the one vehicle,
generate one or more analysis results based on a combination of the card transaction data and the telematics information of the associated financial services card and the one vehicle, respectively; and
an output engine configured to generate and output a report comprising at least one of the one or more analysis results and data pertaining to the association table.

7. The system of claim 6,
wherein the input engine is further configured to receive device information associated with a mobile computing device of a driver of the one vehicle, the device information identifying a location of the mobile computing device and a time and date for the mobile computing device location;
wherein the comparison engine is further configured to determine that a location associated with the one vehicle, and a time and a date associated with the location of the one vehicle substantially matches the location associated with the mobile computing device, and the time and the date associated with the mobile computing device location, respectively; and
wherein responsive to determining that the location associated with the one vehicle and the time and date for the one vehicle location substantially matches the location associated with the mobile computing device, and the time and the date for the mobile computing device location, respectively, the association engine is further configured to create an entry in the association table that maps the unique identifier of the one vehicle with a unique identifier of the mobile computing device.

8. The system of claim 7, wherein the telematics server computer is further configured to:
identify a user associated with the mobile computing device based on the unique identifier of the mobile computing device; and
map the unique identifier associated with the one vehicle with an identifier of the user of the matched mobile computing device.

9. The system of claim 6, wherein the comparison engine is further configured to: reinforce the mapping of the financial service card to the one vehicle by repeating the comparison using card transaction data associated with another subsequent transaction.

10. The system of claim 6, wherein the telematics device is triggered to transmit the telematics information in response to a trigger event, and wherein the trigger event comprises one of a start and stop event of the vehicle's engine, entering and leaving a geo-fence, and pre-determined time intervals.

11. A system comprising:
a plurality of telematics devices,
wherein each telematics device is coupled to an on-board diagnostics port of a respective vehicle of a plurality of vehicles and configured to retrieve telematics information associated with the respective vehicle;
a transaction database configured to store card transaction data associated with a financial services card and transmit the card transaction data responsive to a transaction associated with the financial services card;
a remotely located telematics server communicatively coupled to the transaction database and one or more of the plurality of telematics devices over a communication network,
wherein the remotely located telematics server is configured to:
(a) receive card transaction data associated with a first transaction using the financial services card that is not associated with a vehicle prior to the first transaction, the card transaction data identifying a first location, a first time, and a first date associated with the first transaction;
(b) receive telematics information associated with each vehicle of the plurality of vehicles and create a vehicular database that stores the telematics information;
(c) compare the first location, the first time, and the first date associated with the first transaction and the telematics information associated with each vehicle of the plurality of vehicles stored in the vehicular database to determine if the first location associated with the first transaction substantially matches the location of at least one of the plurality of vehicles at the first time and the first date associated with the first transaction;
(d) determine that the first location associated with the first transaction substantially matches the location of more than one vehicle of the plurality of vehicles at the first time and the first date associated with the first transaction;
(e) responsive to a substantial match with more than one vehicle, compare a second location, a second time, and a second date associated with a subsequent transaction of the financial services card and telematics information associated with each vehicle of the more than one vehicle to determine if the second location associated with the subsequent transaction substantially matches the location of no more than one of the more than one vehicle at the second time and the second date associated with the subsequent transaction;
(f) responsive to determining a substantial match with the telematics information of no more than one of the more than one vehicles,
eliminate a match between the financial services card and a remainder of the more than one vehicles of the plurality of vehicles whose locations do not match the second location associated with the subsequent transaction at the second time and the second date associated with the subsequent transaction,
wherein the match between the financial services card and the remainder of the more than one vehicles is based on the determination that the first location associated with the transaction substantially matches the location of the more than one vehicles of the plurality of vehicles at the first time and the first date associated with the transaction; and
create an association table that maps a unique identifier of the financial services card with a unique identifier of the one vehicle, wherein by mapping the unique identifier of the financial services card with a unique identifier of the one vehicle, the financial services card is associated with the one vehicle;

(g) responsive to associating the financial services card with the one vehicle, generate one or more analysis results based on a combination of the card transaction data and the telematics information of the associated financial services card and the one vehicle, respectively; and output a report comprising at least one of a data pertaining to the association table and the one or more analysis results calculated based on a combination of the card transaction data and the telematics information of the financial services card associated with the one vehicle.

12. The system of claim 11, wherein responsive to a negative determination that the second location associated with the subsequent transaction substantially matches a location of no more than one of the more than one vehicle at the second time and the second date associated with the transaction, the telematics server computer is configured to repeat step (e) with card transaction data associated with another subsequent transaction till the card transaction data of the financial services card substantially matches telematics information of only one vehicle of the plurality of vehicles.

13. The system of claim 11, wherein responsive to a negative determination that the second location associated with the subsequent transaction substantially matches a location of only one of the more than one vehicle at the second time and the second date associated with the transaction, the telematics server computer is configured to repeat step (e) with card transaction data associated with another subsequent transaction for a pre-determined number of times.

* * * * *